UNITED STATES PATENT OFFICE.

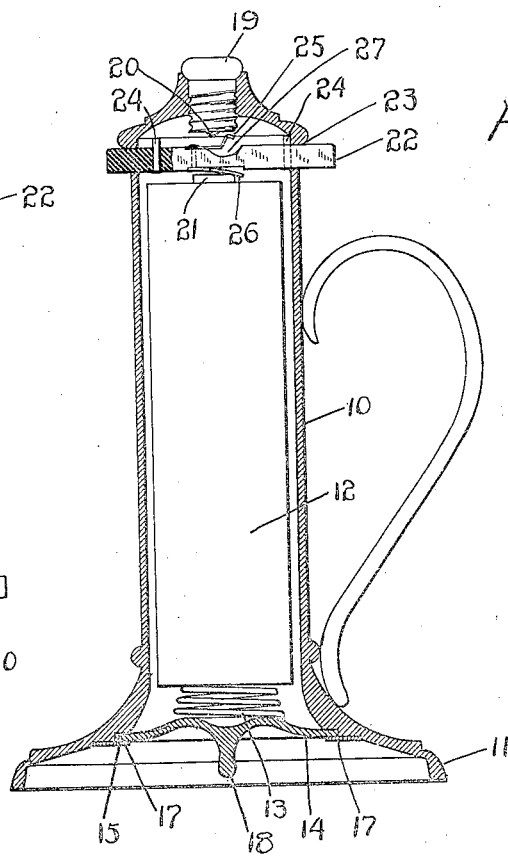

LOUIS WEIDLICH, OF STRATFORD, CONNECTICUT.

ELECTRIC SWITCH.

1,152,580. Specification of Letters Patent. Patented Sept. 7, 1915.

Application filed April 27, 1915. Serial No. 24,241.

*To all whom it may concern:*

Be it known that I, LOUIS WEIDLICH, a citizen of the United States, residing at Stratford, county of Fairfield, State of Connecticut, have invented an Improvement in Electric Switches, of which the following is a specification.

This invention has for its object to provide an electric switch adapted for various uses and especially adapted for use in portable lamps of the candle type, so called. With this end in view I have devised the novel structure which I will now describe, referring to the accompanying drawing forming a part of this specification and using reference characters to indicate the several parts.

Figure 1 is a view partly in elevation and partly in section illustrating a battery lamp of the candle type, the slide bar being in the open circuit position; Fig. 2 an inverted plan view of the base of the lamp; Fig. 3 a perspective of the slide bar detached, and Fig. 4 is an elevation illustrating the use of a returning spring for the slide bar, which makes a flash-light of the structure.

10 denotes the case of the lamp, which is made of metal and is in the circuit. In the present instance I have shown the case as provided with a flaring base 11 and as open at the bottom to receive a dry cell battery indicated by 12. The negative pole of the battery rests upon a spring 13 secured to a retaining plate 14. The retaining plate is made circular and rests upon a circular shoulder 15 in the base. The plate is provided with oppositely disposed notches 16 and the base is provided with lugs or projections 17 which overhang the shoulder, leaving a space between the lugs and the shoulder to receive the plate, and are adapted to register with the notches. The retaining plate is provided with a finger piece 18 for convenience in operation. When a new battery is required, the retaining plate is turned to place the notches in alinement with the lugs, which permits the plate to be removed and the battery to drop out. A new battery is simply slid to place, the retaining plate set in position by placing the notches in alinement with the lugs, and when the plate is seated on the shoulder it is given a quarter turn, more or less, as indicated in Fig. 2, to carry the notches out of alinement with the lugs, leaving the battery securely retained in place by the plate, and resting upon the spring.

19 denotes an incandescent lamp which is seated in the usual manner in the opposite end of the case.

20 denotes the lamp terminal and 21 the battery terminal.

The switch consists essentially of a slide bar 22 which is seated in recesses 23 in opposite sides of the case and is adapted to be moved backward and forward, stop pins or lugs 24 being provided to engage the case on the inner side and limit the movement of the slide bar in both directions. The circuit is completed by means of a contact spring 25 on the upper side of the slide bar, which is suitably shaped to adapt it for engagement with the lamp terminal and a contact spring 26 on the under side of the slide bar, which is suitably shaped to remain in engagement with the battery terminal. Both contact springs are recessed into the slide bar, a recess 27 being provided in the upper side of the bar amply large to receive the outwardly curved engaging end of contact spring 25. In assembling, it is simply required to insert the slide bar into the recesses in the body from the right, as seen in Fig. 1, the springs being forced into the recesses in the slide bar so that the recesses in the case only require to be made just large enough to receive the slide bar. The stop pins or lugs are inserted in the slide bar from the bottom of the case after the bar is in place.

The operation will be obvious from the drawing. In Fig. 1, the parts are shown in the open circuit position. To close the circuit, it is simply required to press the slide bar toward the left to the extreme of its movement, which places contact spring 25 in engagement with the lamp terminal. To open the circuit, the slide bar is simply moved in the opposite direction, that is toward the right, as seen in Fig. 1. The bar will naturally be moved to the extreme of its movement in either direction, although that is not essential so long as contact is made and broken. The friction of contact spring 26 on the battery terminal serves at all times to retain the slide bar in any position in which it may be placed.

Should the structure be required for use as a flash-light, it is simply necessary to provide a spring 28 upon the outer side of the case, and bearing against the end of the slide bar, which acts to retain the slide bar in the open circuit position and to return it to the open circuit position the instant pressure against the opposite end thereof is relieved, the lamp flashing only so long as the slide bar is retained in the circuit closing position against the power of the spring.

Having thus described my invention I claim:

1. In a lamp of the character described, the combination with a case open at one end and provided with a base having a circular shoulder and overhanging lugs, of a battery spring and a circular retaining plate by which it is carried, said plate being adapted to engage the shoulder and being provided with notches adapted to receive the lugs, a battery being retained in place by turning the retaining plate on the shoulder sufficiently to carry the notches out of alinement with the lugs.

2. In combination, a case, a lamp, a battery and a slide bar adapted to be moved transversely in the case, said bar being provided with contact springs adapted to engage the terminals of the lamp and the battery respectively.

3. In combination, a case, a lamp, a battery and a slide bar adapted to be moved transversely in the case, said bar being provided with contact springs adapted to engage the terminals of the lamp and the battery respectively, and with stop lugs adapted to limit its movement in both directions.

4. In combination, a case, a lamp carried thereby, a battery within the case and a transversely movable slide bar having contact springs recessed into opposite sides thereof, one of said springs engaging the battery terminal and the other being adapted to engage the lamp terminal to close the circuit.

5. In combination, a case, a lamp, a battery, a slide bar adapted to be moved transversely in the case, said bar being provided with contact springs adapted to engage the terminals of the lamp and the battery respectively, and a spring acting upon the slide bar to move the lamp contact spring out of engagement with the lamp terminal when pressure on the slide bar is relieved.

6. In a lamp of the character described, the combination with a case, a lamp carried thereby and a battery in the case, of a slide bar adapted to reciprocate in the case and provided with contact springs adapted to engage the terminals of the lamp and the battery respectively, and with recesses adapted to receive the springs in assembling.

7. In combination, a case, a lamp carried thereby, a battery within the case, a switch comprising a transversely movable slide bar having a contact spring adapted to engage the lamp terminal and a contact spring engaging the battery terminal, a spring acting to retain the battery terminal and the corresponding contact spring in engagement, and a detachable retaining plate by which said spring is carried.

In testimony whereof I affix my signature.

LOUIS WEIDLICH.